US006371850B1

(12) United States Patent
Sonoda

(10) Patent No.: US 6,371,850 B1
(45) Date of Patent: Apr. 16, 2002

(54) VIDEO GAME SYSTEM FOR FIGHTING GAME AND METHOD FOR EXECUTING FIGHTING GAME

(75) Inventor: Yoshihiro Sonoda, Tokyo (JP)

(73) Assignee: SEGA Enterprises, Ltd., Tokyo (JP)

( * ) Notice: Subject to any disclaimer, the term of this patent is extended or adjusted under 35 U.S.C. 154(b) by 0 days.

(21) Appl. No.: 09/319,871

(22) PCT Filed: Sep. 10, 1998

(86) PCT No.: PCT/JP98/04060

§ 371 Date: Sep. 1, 1999

§ 102(e) Date: Sep. 1, 1999

(87) PCT Pub. No.: WO99/12617

PCT Pub. Date: Mar. 18, 1999

(30) Foreign Application Priority Data

Sep. 11, 1997  (JP) ............................... 9-267929

(51) Int. Cl.[7] ........................... A63F 13/00; A63F 9/24; G06F 17/00; G06F 19/00
(52) U.S. Cl. ................... 463/8; 463/1; 463/6; 463/7; 463/36; 463/42; 463/46; 700/91; 700/92; 273/148 B; 273/148 R; 273/440.1
(58) Field of Search ................ 463/8, 1, 6, 7, 463/29, 30, 31, 34, 36, 37, 40, 42, 43, 44, 46, 47; 700/91, 92; 273/148 B, 440, 440.1, 441, 453, 460, 461; 709/200, 220, 230

(56) References Cited

U.S. PATENT DOCUMENTS

| 4,072,930 A | * | 2/1978 | Lucero et al. ............... 463/47 |
| 4,521,014 A | * | 6/1985 | Sitrick ................. 273/1 GC X |
| 4,850,591 A | * | 7/1989 | Takezawa et al. ........... 463/37 |
| 4,960,117 A | * | 10/1990 | Moncrief et al. ............ 463/46 |
| 4,976,438 A | * | 12/1990 | Tashiro et al. ............... 463/34 |
| 4,987,492 A | * | 1/1991 | Stults et al. ............ 358/181 X |
| 4,998,199 A | * | 3/1991 | Tashiro et al. ............... 463/29 |
| 5,083,271 A | * | 1/1992 | Thacher et al. ......... 364/411 X |
| 5,107,443 A | * | 4/1992 | Smith et al. ............... 395/158 |
| 5,396,225 A | * | 3/1995 | Okada et al. ................ 463/40 |
| 5,428,528 A | * | 6/1995 | Takenouchi et al. ......... 463/42 |
| 5,558,339 A | * | 9/1996 | Perlman ................. 463/42 X |

(List continued on next page.)

FOREIGN PATENT DOCUMENTS

| JP | 6-327835 | 11/1994 |
| JP | 7-202938 | 8/1995 |
| JP | 8-117445 | 5/1996 |
| JP | 8-294581 | 11/1996 |

*Primary Examiner*—Joe H. Cheng
*Assistant Examiner*—Binh-An D. Nguyen
(74) *Attorney, Agent, or Firm*—Dickstein Shapiro Morin & Oshinsky LLP

(57) ABSTRACT

A plurality of video game units are connected in a ring configuration by means of a communications line. Each of the plurality of video game units comprises: a memory for storing a program for implementing competitive games, whereby a contest is conducted on a display screen by controlling the actions of two characters; control means for controlling the implementation of the program stored in the memory; input means for inputting first data controlling the actions of one of the two characters; and a communications interface circuit for receiving second data controlling the actions of the other of the two characters from one video game unit of a plurality of video game units, and transmitting the first data input via the input means to the one video game unit. The control means controls the display of the two characters on the display screens on the basis of the first data and the second data in accordance with the implementation of said program. By means of this composition, a video game system is provided, whereby a competitive game can be conducted between any of a plurality of video game units.

10 Claims, 9 Drawing Sheets

U.S. PATENT DOCUMENTS

| | | | | |
|---|---|---|---|---|
| 5,630,755 A | * | 5/1997 | Walsh et al. | 463/25 |
| 5,662,523 A | * | 9/1997 | Yasumaru et al. | 463/30 |
| 5,674,127 A | * | 10/1997 | Horstmann et al. | 463/42 |
| 5,695,400 A | * | 12/1997 | Fennell, Jr. et al. | 463/42 |
| 5,704,837 A | * | 1/1998 | Iwasaki et al. | 463/38 |
| 5,772,513 A | * | 6/1998 | Ohishi | 463/46 |
| 5,795,224 A | * | 8/1998 | Yoshida | 463/2 |
| 5,961,386 A | * | 10/1999 | Sawaguchi | 463/43 |
| 6,001,017 A | * | 12/1999 | Okano et al. | 463/43 |
| 6,009,458 A | * | 12/1999 | Hawkins et al. | 709/203 |
| 6,015,348 A | * | 1/2000 | Lambright et al. | 463/42 |
| 6,045,271 A | * | 4/2000 | Barcelou | 463/48 |

* cited by examiner

VIDEO GAME SYSTEM FOR FIGHTING GAME AND METHOD FOR EXECUTING FIGHTING GAME

BACKGROUND OF THE INVENTION

1. Field of the Invention

The present invention relates to a video game system, and more particularly, to a video game system whereby a character whose actions are controlled by the operations of a player and a character controlled by a rival player or by a computer compete against each other on a display screen.

2. Description of the Related Art

Video game devices for conducting competitive games by controlling the actions of fighting characters displayed on the screen of a display device are popular, and video game devices involving a variety of characters have been provided.

As one mode for implementing a competitive game in such a video game device, if one person is playing alone, the player controls a character he or she has selected by controlling an operating lever/switch, and the actions of the opposing character that the player is competing with are controlled by a computer.

In a further mode the character operated by the player himself or herself contends with a character operated by another player, and the players compete for victory.

Therefore, in order to facilitate the implementation of games according to this latter mode, there exist many configurations comprising two video game units in a pair. FIG. 8 is an external view of one example of a video game device comprising two video game units.

In FIG. 8, a video game unit 1GL positioned on the left-hand side and a video game unit 1GR positioned on the right-hand side are coupled to form an integral element. These units each comprise, respectively, a high-back chair 1 in which a player sits, and a display device 2 facing same.

Moreover, a pair of operating levers/switches 3 are provided for each video game unit operated by a player. The direction of movement of the characters displayed is controlled by moving these operating levers/switches 3. Furthermore a control button 30, or the like, is provided on each lever.

By operating this control button 30 independently, or simultaneously with the operating lever 3, a weapon can be fired, or a movement of the character, for example, a special movement effect, such as a jump or dash, etc., can be generated.

Here, in the video game device shown in FIG. 8, the control boards of the video game unit 1GL and the video game unit 1GR, positioned on the right-hand side, which are not shown in the diagram, are of the same composition. Therefore, players can play a competitive game alone against the computer at the video game unit 1GL and the video game until 1GR, independently.

Furthermore, the video game until 1GL and the video game unit 1GR have communications interface circuits. Consequently, a competitive game can be played between the video game units, in other words, between two players, by mutual transmission and reception of operational data.

Here, as shown in FIGS. 9A and 9B a case is considered where two video game devices are installed in a game center, or the like. In this case, configurations as shown in FIG. 9A and FIG. 9B can be conceived as modes for connecting the communications interface circuits.

Namely in FIG. 9A, a first video game device is connected by communications wires CW1, CW2 to a second video game device, such that pairs are formed between the left-hand units and right-hand units, in other words, video game units 1GL and 2GR, and video game units 1GR and 2GL form pairs, respectively.

In FIG. 9B, the communications wires CW1, CW2 connect the left-hand video game unit and the right-hand video game unit in each video game device, such that pairs are formed between video game units 1GL and 1GR, and between video game units 2GL and 2GR.

In a competitive game as described above, at the end of a game, for each character appearing, the model name of the character (for example, the pet name of a robot character, or the like,) the number of consecutive victories, and the character s attacking tendencies, etc. are stored in a memory as characteristics parameters. Therefore, the values of these characteristics parameters are updated in accordance with the character's past contests.

In some cases, a player may wish to refer to the characteristics parameters of the characters in order to compete against a character having stronger parameter values.

In this case, even if the video game units 1GL, 1GR, 2GL and 2GR are capable of displaying individual characters, the video game units paired together by the communications wires CWl, CW2 are fixed in either of the configurations shown in FIG. 9A or FIG. 9B.

Therefore, the player is only able to compete against the character displayed on a single fixed video game unit. Moreover, in a game centre where the video game devices are installed, if, for instance, video game units 1GL and 2GL of the aforementioned video game units 1GL, 1GR, 2GL and 2GR are occupied by independent play (a game against the computer), then two customers visiting the game centre together will not be able to play a competitive game. In situations of this kind, there is poor flexibility in the relationship between the number of players and the unoccupied video game units.

Moreover, in FIGS. 9A and 9B, if a player at any one video game unit which is paired with another video game unit by the communications wires continues to play a one-player game, then it is not possible to play a competitive game against the player in that same pair of units.

Furthermore, even if a player wishes to play a competitive game against another player at a unit in a different pair, it will not be possible to conduct a competitive game between the two players, because their units are not linked by the communications wires.

SUMMARY OF THE INVENTION

Therefore, it is an object of the present invention to provide a video game system and a method for conducting competitive games, whereby a competitive game can be conducted between characters at any video game unit installed.

It is a further object of the present invention to provide a video game system and a method for conducting competitive games, whereby, when a plurality of video game units are installed, a competitive game involving a greater variety of characters can be conducted and the probability of being able to play a competitive game against another player is increased.

The video game system for conducting competitive games according to the present invention, which resolves the aforementioned problems, comprises a plurality of video game units connected in a ring configuration by means of a communications line, each of the plurality of video game units comprising: a memory storing a program for implementing competitive games whereby a contest is conducted on a display screen by controlling the actions of two characters; control means for controlling the implementation of the program stored in the memory; input means for inputting first data controlling the actions of one of the two characters; and a communications interface circuit for receiving second data controlling the actions of the other of the two characters from one video game unit of a plurality of video game units, and transmitting the first data input via the input means to the one video game unit.

The control means controls the display of the two characters on the display screens on the basis of the first data and the second data in accordance with the implementation of the program.

In one embodiment, the plurality of video game units are accommodated, respectively in pairs, in common video game device frames.

In one embodiment the communications interface circuit transmits the first data onto the communications line by writing the first data to a prescribed position assigned to the relevant video game unit, of prescribed positions assigned respectively to the plurality of video game units in a packet-type data format, and receives the second data written to a prescribed position assigned to a video game unit relating to a game opponent, from the communications line. Moreover, a video game unit having input means for inputting the first data identifies the one video game unit which is to form an opponent in a competitive game by means of a competition-enabled flag written to a prescribed position assigned to the one video game unit in a packet-type data format.

Yet further, in the method for conducting competitive games according to the present invention, which resolves the aforementioned problems, a competitive game is conducted between different video game units, by means of the steps of: connecting a plurality of video game units storing a program for implementing competitive games, whereby a contest is conducted on a display screen by controlling the actions of two characters, in a ring configuration by means of a communications line; exchanging data for controlling characters corresponding respectively to the two characters between any one video game unit and any other video game unit of the plurality of video game units; and executing the program by synchronizing the any one video game unit and the any other video game unit.

In one embodiment, the any one video game unit transmits a competitive game request to the any other video game unit, the any other video game unit transmits a competitive game request acceptance confirmation to the any one video game unit, and competitive game conditions are exchanged between the any other video game unit and the any one video game unit, whereupon implementation of the program is started. Furthermore, the competitive game conditions relating to the aforementioned composition set the game time and number of set games.

Moreover, when the competitive game conditions are completed, either one of the any one video game unit and the any other video game unit determines which one of the characters operated by the any one video game unit and the any other video game unit has the higher number of points in the game.

According to the device and method of the present invention having the aforementioned composition, it is possible to conduct a competitive game between any of a plurality of video game units.

Further objects and advantages of the present invention will become apparent from the embodiments thereof, which are described with reference to the drawings.

DESCRIPTION OF THE PREFERRED EMBODIMENTS

Figures 1A, 1B:
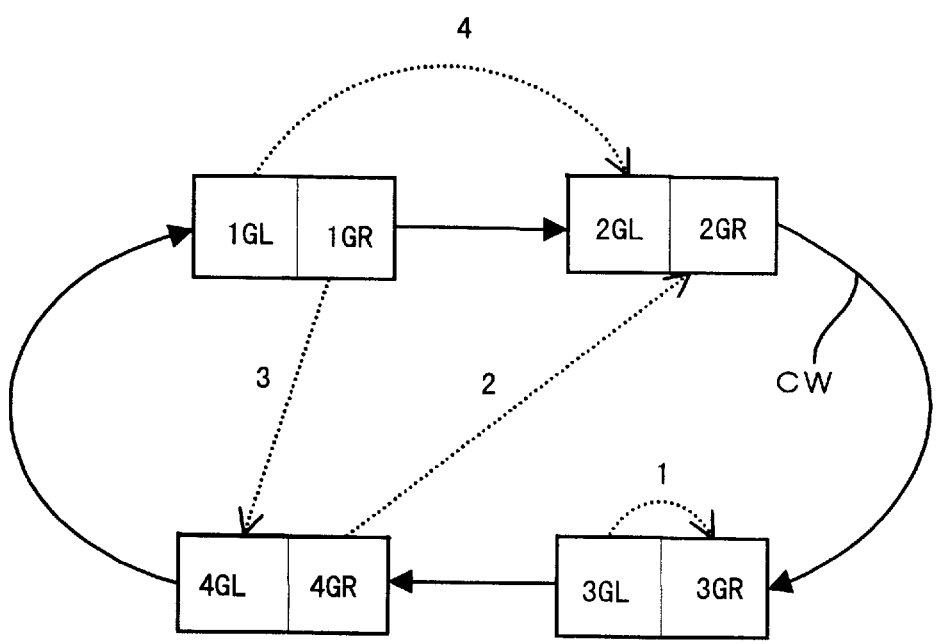
FIGS. 1A and 1B provide a diagram illustrating a mode for implementing a game device according to the present invention.

Below, embodiments of the present invention are described with reference to the drawings. In the drawings, parts which are the same or similar are given the same reference number or reference symbol.

Figure 8:
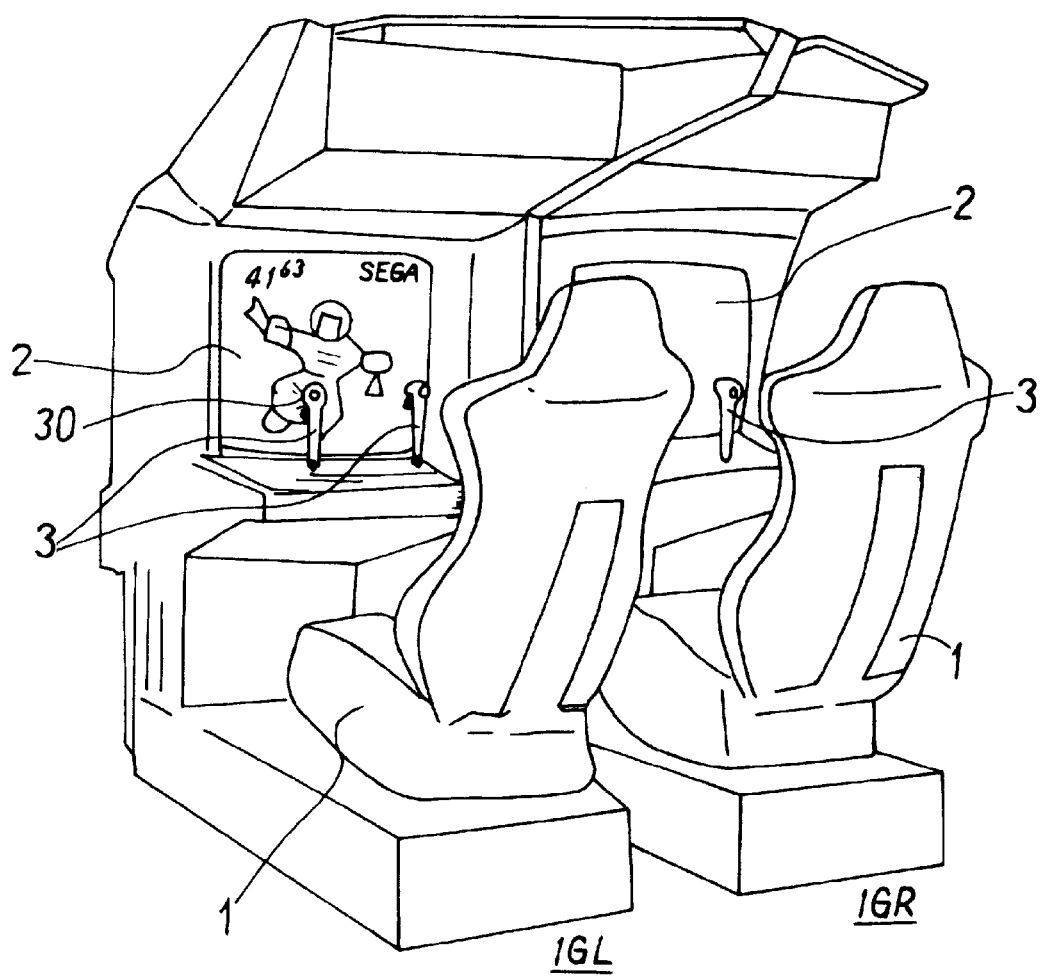
FIG. 8 is a diagram showing the external appearance of one example of a video game device comprising two video game units.
Figure 9A:
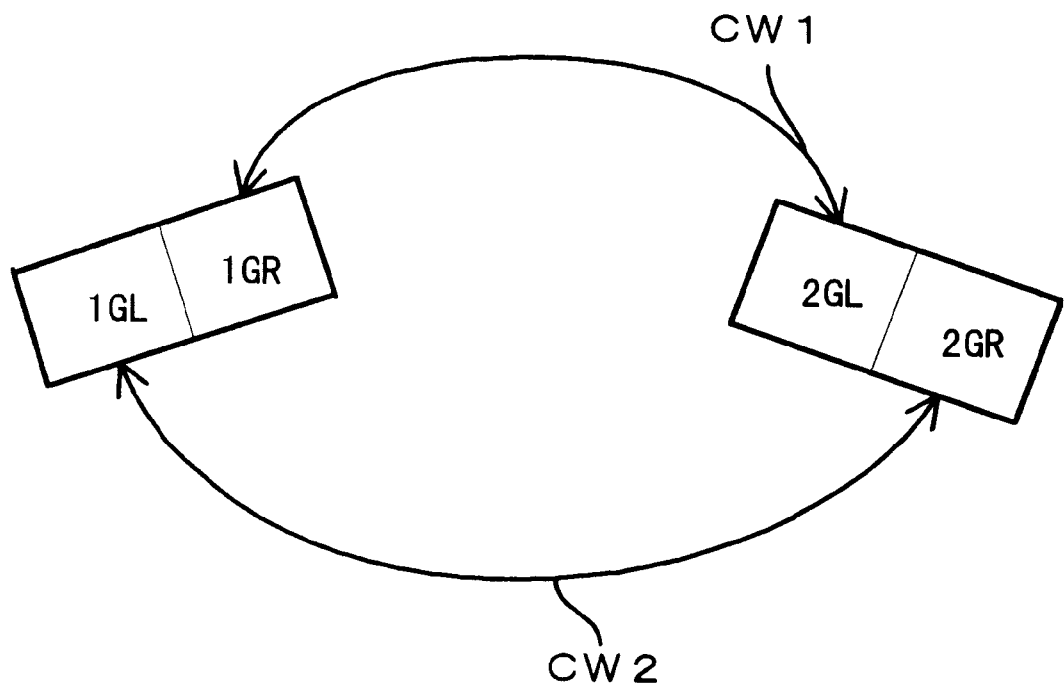
FIGS. 9A and 9B provide examples of configurations for connecting a first game device and a second game device.
Figure 9B:

FIGS. 1A and 1B are diagrams showing one embodiment of a video game system according to the present invention. In FIG. 1A, a plurality of video game devices is connected in a ring by means of communications wires CW. In other words, in the example in FIG. 1A, four video game devices, each respectively comprising a pair of video game units as shown in FIG. 8, are connected in a ring configuration.

The first video game device comprises a pair of video game units 1GL, 1GR in a single casing and the second video game device similarly comprises a pair of video game units 2GL, 2GR, the third video game device comprises a pair of video game units 3GL, 3GR, and the fourth video game device comprises a pair of video game units 4GL, 4GR.

The video game units provided as a pair in each video game device each respectively comprise a seat 1, a monitor 2 facing same, and a board containing an operating lever/switch 3. The respective data from the eight video game units connected in a ring configuration in FIG. 1A is circulated by being carried in a packet-type data format transmitted on the communications wire CW at intervals of 1/60th of a second. Data in this packet-type data format is transmitted constantly on the communications wire, whilst being used by the video game system.

In FIG. 1B, the respective status data relating to the eight video units 1GL, 1GR, 2GL, 2GR, 3GL, 3GR, 4GL, 4GR connected in a ring configuration is arranged in fixed positions in the packet data format.

Therefore, each of the video game units can identify and receive status data relating to a video game unit forming a game opponent, from its position within the received packet data.

For example, in FIG. 1B, a status flag and parameter data for the character (fighter) controlled at video game unit 1GL is carried in position 1GL of the packet data format, as data for the video game unit IGL.

The status flag indicates, for example, whether or not the device is enabled for a competitive game. Therefore, another video game unit can identify video game units which are in a competition-enabled state by referring to the status flags. Furthermore, a request for a competitive game can be made to a video game unit which indicates that it is in a competition-enabled state by the following method, for example.

Namely, the address of a game unit requesting a competitive game is written to the position of the aforementioned packet data format corresponding to the video game unit indicating that it is in a competition-enabled state.

Thereby, the video game unit indicating that it is in a competition-enabled state can identify the video game unit requesting a competitive game from the data written to its own corresponding position in the packet data format. Moreover, a competitive game request response can be sent back to the identified video game unit requesting a competitive game, via its corresponding data position.

The status flag written to the position of the corresponding game unit in the packet data format is set such the competition-enabled state is displayed continuously, with the exception of game units which are formed into a competition pairing.

In this way, in the present invention, data can be transmitted and received between any of the video game units connected by the communications wire CW.

Furthermore, by means of the procedure described below, it is possible to form a competition pairing between any two video game units. Moreover, it is possible to conduct competitive games respectively between video game units in a plurality of pairs of video game units, simultaneously.

In FIG. 1A for example competition pairings are formed, respectively, by video game units 3GL and 3GR (pair 1), video game units 2GR and 4GR (pair 2), video game units 1GR and 4GL (pair 3) and video game units 1GL and 2GL (pair 4). In this way, competitive games can be conducted simultaneously between video game units formed into competition pairings.

Figure 2A:
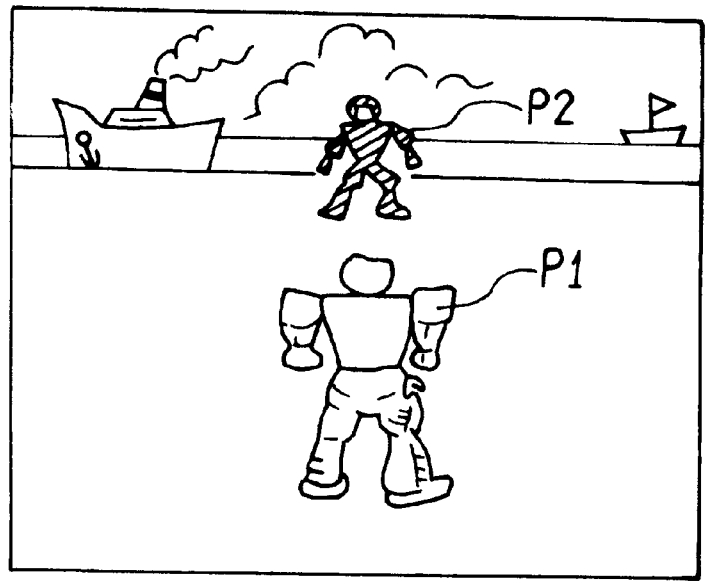
FIGS. 2A and 2B provide examples of a display screen of a display device 2 in a case where a competitive game is conducted between video game units formed into a competition pairing.

FIG. 2 is one example of a screen of a display device 2 in this case, supposing that video game units 1GL and 2GL (pair 4 in FIG. 1A) are used. FIG. 2A is one example of a screen displayed on the video game unit 1GL and it shows an image from a camera positioned on the side of character P1 operated by a player at video game unit 1GL.

Therefore, in this image, character P1 operated by the player at video game unit 1GL is displayed with its back facing the camera. The character P2 operated by the player at video game unit 2GL is displayed facing the camera.

Figure 2B:
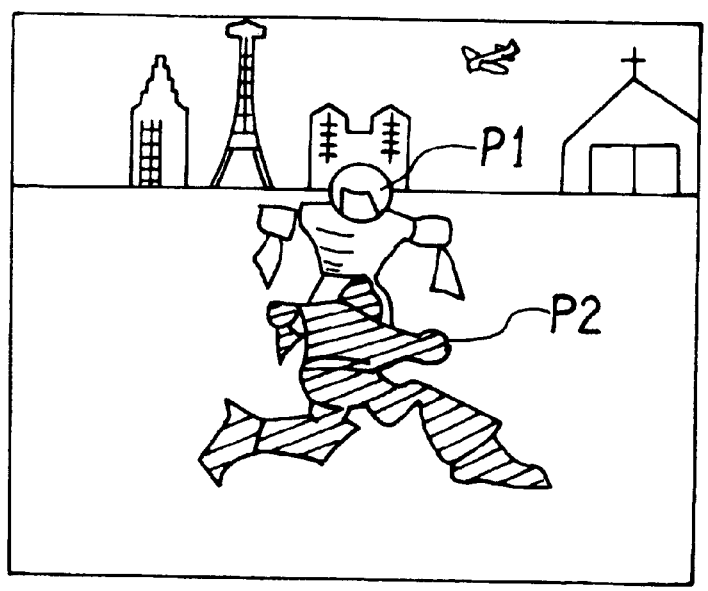

Conversely to FIG. 2A, FIG. 2B is an example of a screen displayed at the video game unit 2GL; the character P1 operated by the player at video game unit 1GL is facing the camera, whilst the back of the character P2 operated by the player at video game unit 2GL Is displayed.

If, for example, a player is playing a competitive game alone at the video game unit 1GL, the computer becomes the opponent, and P2 becomes a character controlled by the computer, whose actions are directed automatically in accordance with a program.

Figure 3:
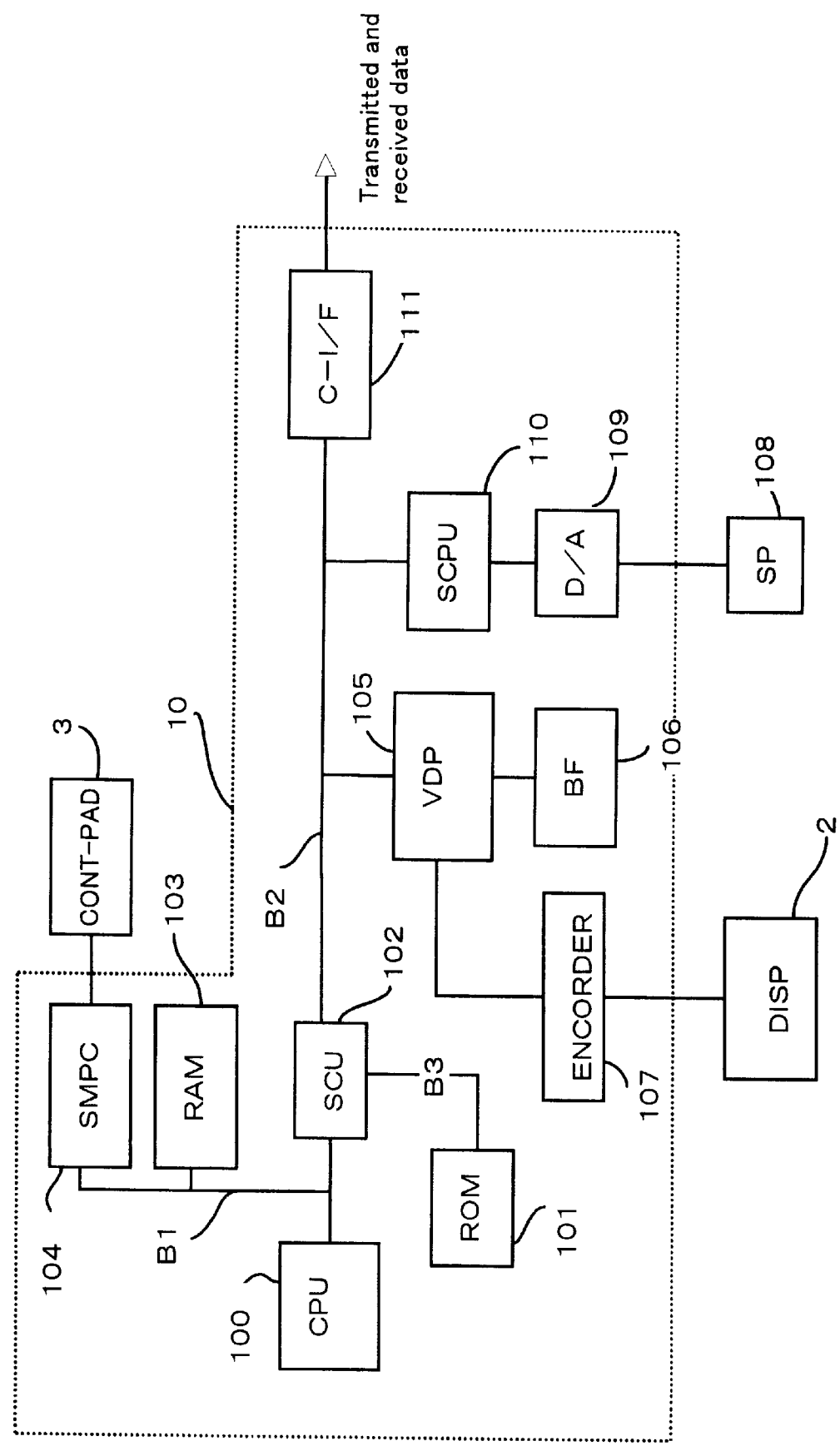
FIG. 3 is a block diagram of an example of a video game unit composition according to the present invention.

FIG. 3 is a block diagram of the composition of one embodiment of a video game unit according to the present invention and this composition is common to each of the video game units. In FIG. 3, the region 10 surrounded by the dotted line is the portion accommodated in the main body of the game unit.

A main CPU 100, ROM 101 and video display processor (VDP) 105, etc. are connected respectively to a first bus B1, a second bus B2 and a third bus B3.

The first bus B1, second bus B2 and third bus B3 are also connected commonly to a system control unit (SCU) 102. In FIG. 3, the main CPU 100 controls the whole system. The main memory 103 is a work RAM used by the main CPU 100. The system control unit 102 has the function of controlling each of the aforementioned buses.

The video display processor (VDP) 105 has a geometry processing function for performing co-ordinates conversion and light source co-ordinates calculation for converting polygon data co-ordinates comprising three-dimensional co-ordinates forming an image to two-dimensional co-ordinates, and a rendering function.

The VDP 105, meanwhile, is connected to a texture buffer which is constituted by part of the buffer memory 106. Vertex data for polygons constituting a fighter character or background in the three-dimensional virtual space in which the competitive game is depicted is read out from the ROM 101, along with texture data, and the like, which is attached to the polygons. It is then recorded temporarily in the texture buffer.

The rendering function involves applying texture data recorded in the texture buffer to each pixel constituting a polygon surface, on the basis of the polygon vertex data.

Furthermore, the VDP 105 is connected to a Z buffer, which is constituted by a part of the buffer memory 106, and Z direction (depth direction) data for each polygon is recorded therein when the polygon data is converted to two-dimensional co-ordinates.

Therefore, when polygon data to which texture data has been applied is written by the VDP 105, pixel by pixel, to a frame buffer (omitted from diagram) which is connected to the encoder 107, pixels having a high priority on the basis of the Z direction (depth direction) data are written as the effective pixels, thereby creating image display data.

The frame buffer memory has a dual buffer structure, and whilst the image display data for one screen is being written to one frame buffer memory, the image display data for one screen is output from the other frame buffer memory to the encoder 107.

The encoder 107 converts the digital image display data to an analogue video signal, which is sent to the display device 2, where it is displayed.

The main CPU 100 and main memory 103 are connected via the first bus B1 to the system control unit 102. The VDP 105, meanwhile, is connected via the second bus B2 to the system control unit 1.

The ROM 101 connected to the third bus B3 is a fixed memory for recording game programs.

Furthermore, the control lever/switch operated by the player is connected via an I/O control circuit (SMPC) 104. The CPU 100 performs calculations for changing the display co-ordinate positions of the displayed characters, and the like, on the basis of the operational data input from the control lever/switch 3, and the results of these calculations are reflected in the polygon data. This polygon data is supplied to the VDP 105, where it is subjected to the aforementioned geometry processing and rendering processing.

Moreover, a sound source processing circuit (SCSP) 110 is connected to the second bus B2 and controls the generation of sound from a PCM/FM sound source. The sound source processing circuit 110 contains a sound CPU and work RAM (omitted from diagram), which control sound processing.

The sound source processing circuit 110 is also connected to a D/A conversion circuit 109, which converts the digital sound source to an analogue signal and supplies the resulting audio signal to a speaker 108

In FIG. 3, a communications interface circuit 111 is also connected to the second bus B2. Under the control of the main CPU 100, control data for the character at the video game unit in question input by means of the operating lever/switch 3 is transferred to the communications interface circuit 111 of the opponent's video game unit.

On the other hand, control data for the character at the opponent's video game unit input by the opponent by means of the operating lever/switch 3 is received via the communications interface circuit 111 of the opponent's video game unit.

The character control data supplied from the opponent's video game unit is controlled and displayed on the screen 2 of the display device, in exactly the same manner as a character controlled by the computer when a player conducts a competitive game alone against the computer.

Figure 4:
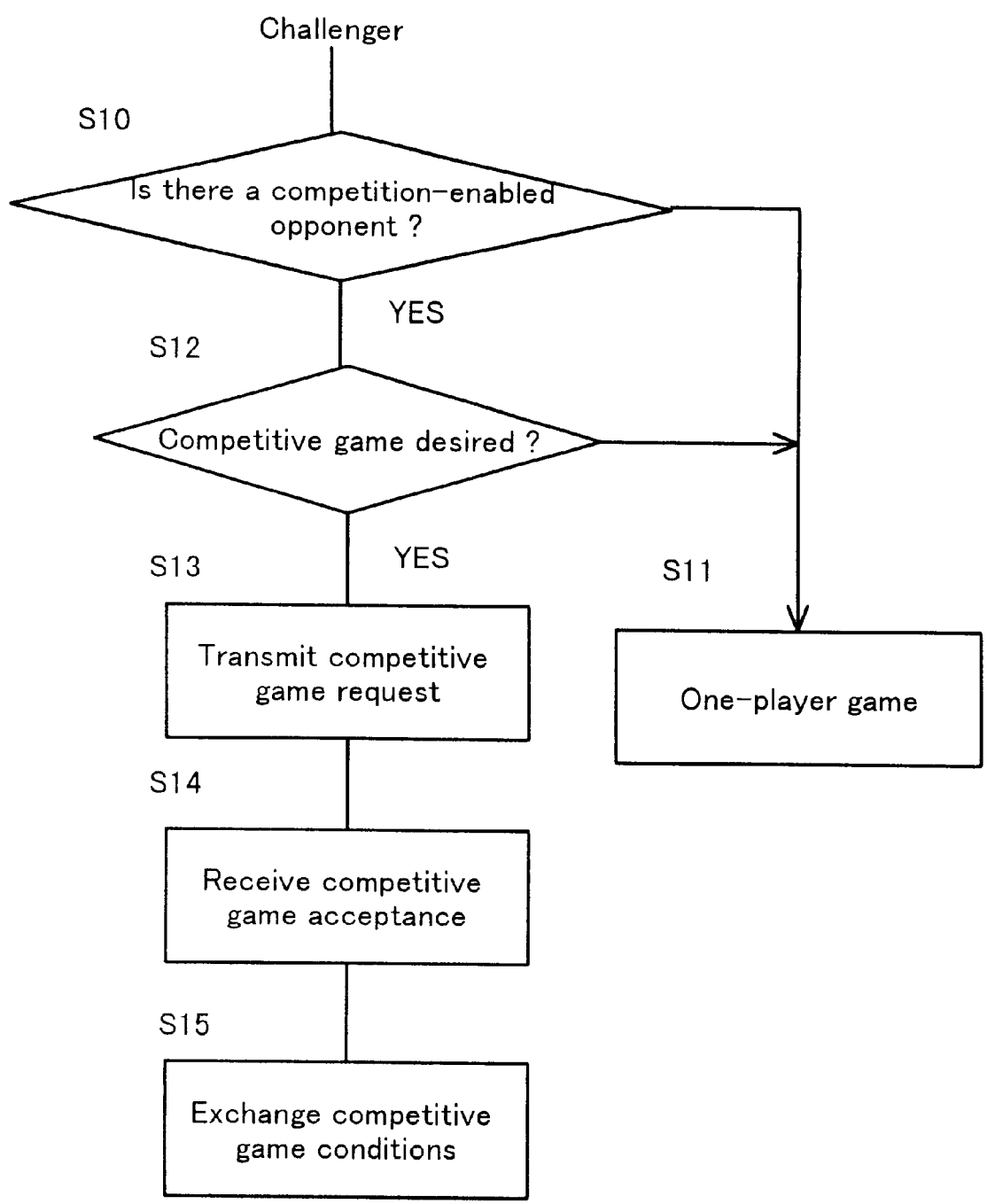
FIG. 4 is an operational flowchart relating to a challenger in a case where a player wishes to play a competitive game against another player.
Figure 5:
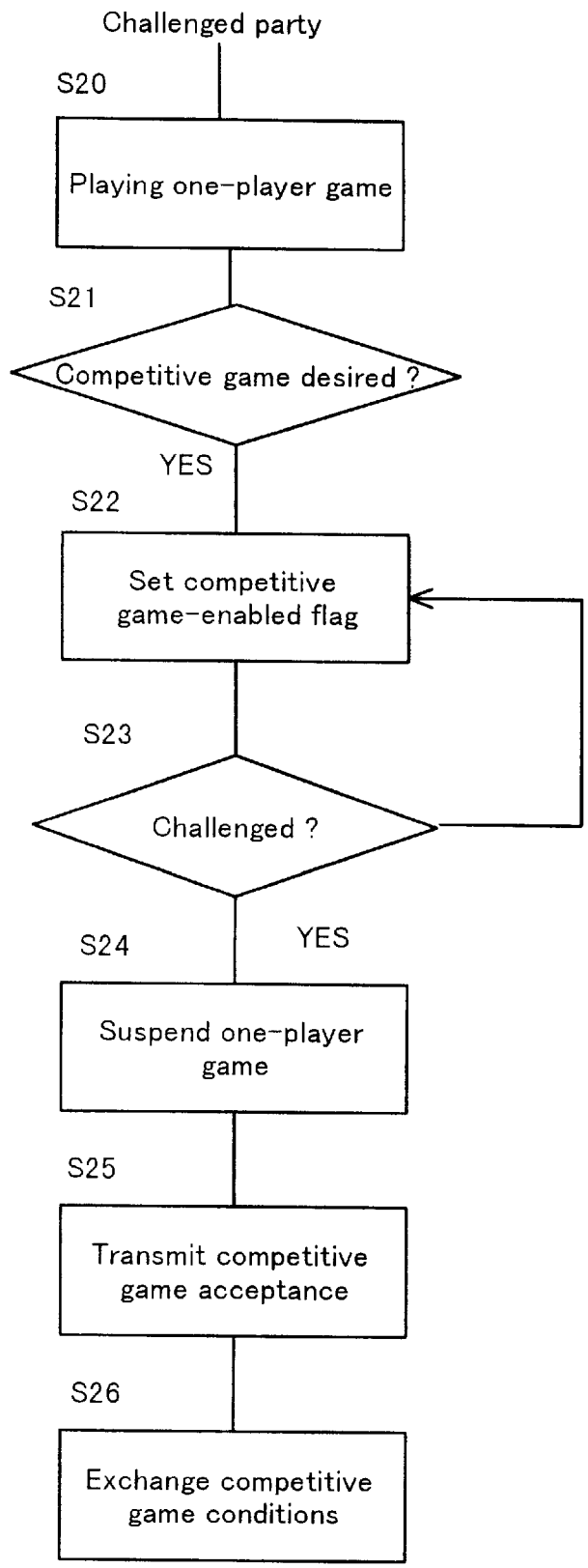
FIG. 5 is an operational flowchart relating to a challenged party in a case where a player wishes to play a competitive game against another player.

Next, the processing involved in a method for implementing a competitive game according to the present invention as executed by the video game unit illustrated in FIG. 3 above is described by means of the operational flowcharts in FIG. 4 and FIG. 5, with particular reference to the processing prior to the start of a game.

The processing described below is implemented by means of the main CPU 100 executing and controlling a game program stored in the ROM 101 in FIG. 3.

FIG. 4 is an operational flowchart of a case where a player wishes to play a competitive game against an opponent. In the embodiments of the present invention, a player on the side issuing a request for a competitive game is called the "challenger" and a player on the side receiving a request for a competitive game is called the "challenged party".

Figure 6:
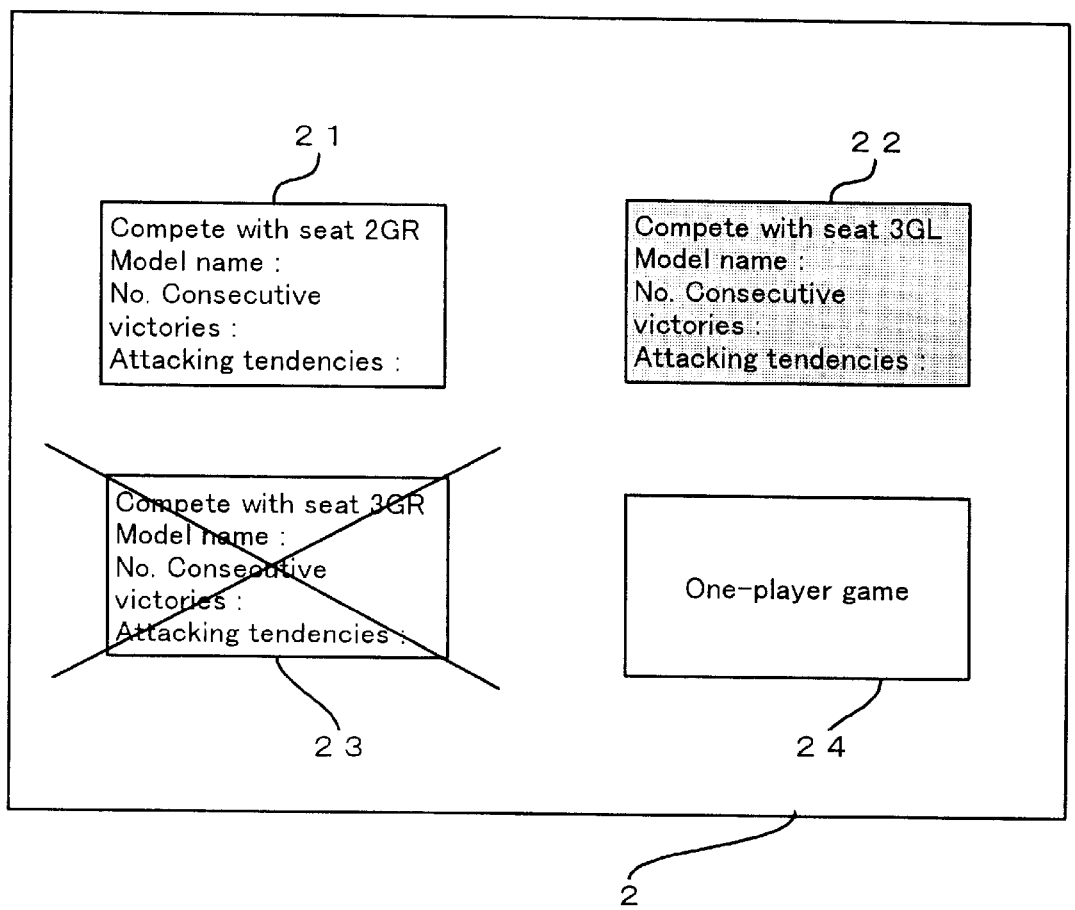
FIG. 6 is an example of display screen 2 and more particularly, it is an example of screen display where selection instructions for a competitive game are given.

In FIG. 4, the challenger confirms via the display screen 2 of the video game unit whether there is a opponent capable of engaging in a competitive game. FIG. 6 is one example of a display screen 2 for making this confirmation. The screen display example relates in particular to competitive game selection and instruction. The state of each video game unit is displayed on the display screen 2.

In FIG. 6, the respective states of the video game units 2GR, 3GL and 3GR are shown in regions 21, 22 and 23. A region 24 for selecting a competitive game against the computer (one-player game) is also displayed.

The regions 21, 22 and 23 can be switched by means of the operating lever/switch 3 of the game device illustrated in FIG. 8 to display the states of other video game units in succession. Furthermore, of the video game units displayed, the display region relating to the video game unit of an opponent who wishes to play a competitive game can be selected by moving a cursor using the operating lever/switch 3.

In FIG. 6, the display region 22 relating to video game unit 3GL is selected by moving the cursor. Furthermore, in FIG. 6, the display region 23 relating to video game unit 3GR is marked by an X symbol, which indicates that this unit is in a state where it cannot accept competitive game challengers.

Therefore, if an X symbol Is shown, that unit cannot be selected. The unit may be in a state where it cannot accept competitive game challengers because, for example, it is already engaged in a competitive game, or it is running an advertisement, ending demonstration, or the like.

In the video game unit state display regions on the display screen shown in FIG. 6, information such as the character's model, number of consecutive victories and attacking tendencies, etc. is displayed. Consequently, it is possible to ascertain the strength of the opponent to be engaged, thereby obtaining information for the process of selecting a game opponent.

Returning now to FIG. 4, the challenger confirms by means of the display screen in FIG. 6 whether or not there exists an opponent who is capable of playing a competitive game (step S10). If there is no opponent capable of playing a competitive game, or if the player wishes to play against the computer, then he or she selects display region 24 indicating "one-player game" on the display 2 in FIG. 6 (step S11).

If the player wants a competitive game, then he or she selects an opponent from the opponents who are available for competition (step S12). In the example in FIG. 6, the player has selected video game unit 3GL displayed in region 22 by moving the cursor.

When an opponent is selected, a competitive game request is sent to the opponent (step S13). In response to this competitive game request, the video game unit receiving the request transmits a competitive game acceptance confirmation (step S14).

Here, when a competitive game request is sent to a selected opponent (step S13), the address ID relating to the video game unit issuing the request and the competitive game request data are written to a position corresponding to that video game unit in the packet data format illustrated in FIG. 1B above.

Accordingly, the destination video game unit is able to identify the address ID of the video game unit issuing the competitive game request, and the competitive game request from that video game unit, as written to its own data region in the packet data format.

Moreover, it is able to send a competitive game acceptance confirmation to the video game unit issuing the competitive game request by writing the confirmation to the position of the packet data format corresponding to the video game unit which has issued that competitive game request.

When acceptance of a competitive game is confirmed in response to an identified competitive game request in this way, game conditions are then exchanged (step S15). In this exchange, game conditions, such as the game time and the number of set games, etc. are transmitted and the conditions accepted by the opponent side are fed back. If the values fed back agree with the transmitted values, then a game conditions agreement message is sent back to the opponent.

FIG. 5 is a processing flowchart relating to a challenged party. If, during the process where a one-player game is usually implemented (step S20), the player wishes to play a competitive game against an opponent at another video game unit (step S21), then a competition-enabled flag is raised (step S22). On the basis of this flag, a competition-enabled display is shown on the display screen of the other video game units, as described in relation to FIG. 6.

Here, if a competitive game request is transmitted by any of the other units whilst the challenged party is in the process of playing a one-player game, in other words, if a challenge is made (step S23), then the game being conducted by the challenged party alone against the computer is interrupted (step S24).

In this case, as described previously, a competitive game request acceptance confirmation is transmitted (step S25), whereupon game conditions are exchanged with the challenger (step S26).

Figure 7:
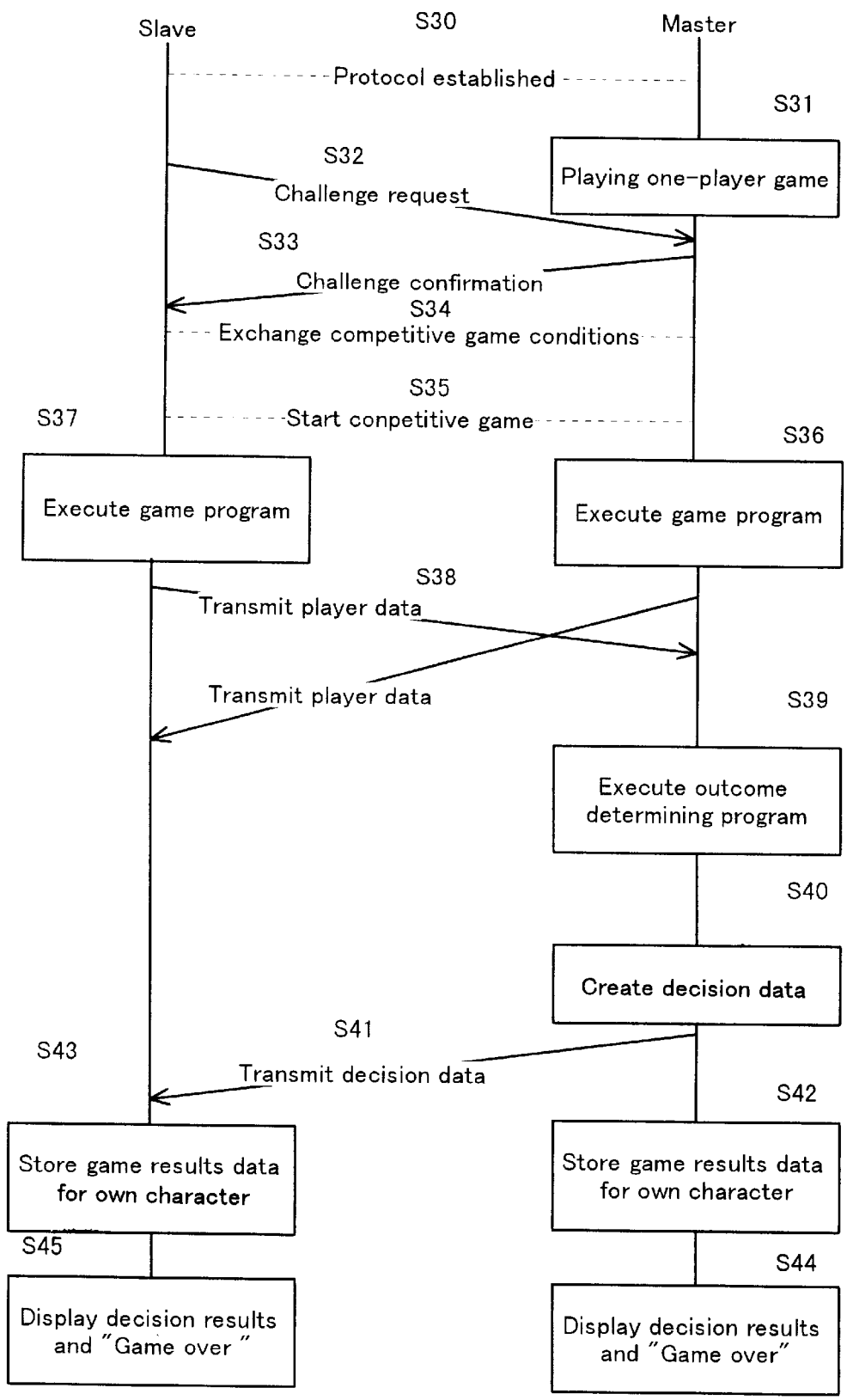
FIG. 7 is a flowchart of a sequence between video game units conducting a competitive game.

When the game conditions have been exchanged between the two opponents in this way, the game programs in both video game units are started simultaneously. This procedure is described in detail by the flowchart of sequencing between video game units conducting a competitive game illustrated in FIG. 7.

In the present invention, video game units formed into a competition pairing have the same game program stored in their respective ROMS 101. When the power supply is switched on, a communications protocol is established between all the video game units (step S30).

In this embodiment, it is supposed that one video game unit is conducting a one-player game against the computer (step S31) and that another video game unit transmits a competitive game challenge request (step S32).

Here, the side being challenged is defined as the "game master" and the side making the challenge is defined as the "game slave".

"Game master" and "game slave" are definitions which distinguish which of the game units is responsible for determining the outcome of a game by means of software. Generally, if a game unit which was conducting a one-player game against the computer then conducts a competitive game against another game unit, this unit becomes the game master and is responsible for determining the outcome of the game by means of software.

If the game master having received a challenge request is in a state where it can accept the challenge, then it returns a challenge confirmation to the game slave side (step S33). Thereupon, game conditions are exchanged between the game slave and game master (step S34).

Here "game conditions" refers to the game time and number of set games, for example. A competitive game is then conducted under these game conditions, and as described hereinafter, the outcome is determined by the video game unit forming the game master.

After the exchange of game conditions, timing between the game slave and game master is synchronized and the two units start to execute the game program (step S36). In the process of implementing the game program, each video game unit transmits data for the character (fighter) corresponding to the player's control of the operating lever 3 to the opponent's video game unit (step S38).

Thereby, as described in relation to FIGS. 2A and 2B, if the character on the game master side is taken as P1 and the character on the game slave side is taken as P2, then the display screen of the video game unit on the game master side displays and controls the movement of character P1 in accordance with the direct input data controlled at the video game unit on the game master side.

The movements of character P2 are displayed and controlled in accordance with transmitted input data which is input at the video game unit on the game slave side.

Conversely, the display screen of the video game unit on the game slave side displays and controls the movements of character P2 in accordance with directly input data controlled at the video game unit on the game slave side. The movements of character P1 are displayed and controlled in accordance with transmitted input data which is input at the video game unit on the game master side.

Here, in a competitive game, the characters (fighters) that generally appear in competition each have initially assigned parameters. For instance, during the course of a game, if one character performs a prescribed action (for example, firing a gun, etc.) with respect to the opponent character, and the timing matches prescribed conditions, then the parameter value of the former character is increased, whilst the parameter value of the opponent character is reduced.

Thereby, when the previously set game conditions (game time, set number of games, etc.) have been completed, the outcome of the game is determined on the basis of the parameter values at the end of the game. In this embodiment, a program for determining the outcome is executed in the video game unit on the game master side (step S39).

At the game master, in executing this program for determining the outcome, decision data based on this determination of the outcome is created (step S40), whereupon the decision data is transferred to the game slave side (step S41).

Therefore, on the game slave side and the game master side, the parameter values relating to the competition results for the character operated at that video game unit are changed and stored in the SRAM 103 (see FIG. 4) (steps S42, 43). The subsequent game is conducted on the basis of this stored data. Thereupon, the respective decision results are displayed at the game slave unit and the game master unit, and 'game over' is displayed.

The foregoing description related solely to one-against-one player games, but the present invention is not limited to this application. In other words, as described previously, a game can also be conducted by exchanging data in one-against-several player or several-against-several playersituations. In this case also, data can be transmitted and received between the game units forming a configuration by means of the packet addresses.

As described above, according to the present invention, a video game system is provided, whereby a competitive game can be conducted between any video game units of a plurality of video game units. Furthermore, a video game system is also provided, whereby a competitive game can be conducted with another game unit at any desired time.

Moreover, competitive games can be conducted respectively between video game units of any of a plurality of groups formed by a plurality of video game units.

Therefore, players can play competitive games against a variety of characters, thereby making the players' interest in the game last longer.

Consequently, the frequency of use of the video game device is increased, which is advantageous for the operator of the video game device.

What is claimed is:

1. A video game system for conducting competitive games comprising:
   a plurality of video game units connected in a ring configuration by means of a communication line, each of said plurality of video game units comprising:
   a memory for storing a program for implementing competitive games whereby a contest is conducted on a display screen by controlling the actions of a plurality of characters;
   control means for controlling the implementation of the program stored in said memory;

input means for inputting first data controlling the actions of one of said plurality of characters; and a communications interface circuit for receiving second data from another of said plurality of video game units, said second data controlling the actions of another of said plurality of characters, and transmitting the first data input via said input means to said another video game unit through said ring configuration;

wherein status information of the other of said plurality of video game units of said video game system is displayed on each respective display screen and each of said video game units can issue a request for a competitive game to a selected one of the other of said plurality of video game units within said ring configuration, and wherein said status information includes the availability of the other of said plurality of video game units to accept a request for a competitive game, and wherein said selected video game unit is selected by an operator of the requesting game unit, and wherein said control means controls the display of the respective character and another character on the respective display screens on the basis of said first data and said second data in accordance with the implementation of said program.

2. The video game system for conducting competitive games according to claim 1, wherein said plurality of video game units are accommodated, respectively in pairs, in common video game device frames.

3. The video game system for conducting competitive games according to claim 1, wherein said communications interface circuit transmits said first data onto said communications line by writing said first data to a respective prescribed position of a plurality of prescribed positions in a packet-type data format, each respective video game unit being assigned a respective prescribed position of said packet-type data, and receives said second data written to a prescribed position assigned to said another video game unit relating to a game opponent, from said communications line.

4. The video game system according to claim 1, wherein each video game unit identifies said another video game unit which is to form an opponent in a competitive game by means of a competition-enabled flag written to a prescribed position assigned to said another video game unit in a packet-type data format.

5. The video game system according to claim 4, wherein a competitive game request is transmitted by writing the address of the video game unit requesting the competitive game to the prescribed position assigned to said identified another video game unit which is to form an opponent in the competitive game.

6. A method for conducting competitive games, whereby a competitive game is conducted between different video game units, comprising the steps of:

connecting a plurality of video game units storing a program for implementing competitive games, whereby a contest is conducted on a display screen by controlling the actions of two characters, in a ring configuration by means of a communication line;

displaying status information of other video game units on a respective display screen of each of said plurality of video game units within said ring configuration, said status information including the availability of said other video game units to accept a competitive game request;

subsequent to said displaying step, transmitting a competitive game request from a first video game unit to a selected any other video game unit through said ring configuration, said selected video game unit transmitting a competitive game request acceptance confirmation to said first video game unit if said competitive game request is accepted, and wherein said selected video game unit is selected by an operator of said first video game unit;

exchanging data for controlling characters corresponding respectively to said two characters between said first video game unit and said selected video game unit of said plurality of video game units; and executing said program by synchronizing said first video game unit and said selected video game unit.

7. The method for conducting competitive games according to claim 6, wherein competitive games can be conducted respectively between a plurality of groups of video game units, said any one video game unit and said any other video game unit being taken as one group.

8. The method for conducting competitive games, whereby a competitive game is conducted between different video game units, according to claim 6, wherein if said competitive game request acceptance confirmation is transmitted, said method further comprises:

exchanging competitive game conditions between said selected any other video game unit and said any one video game unit, wherein implementation of said program is started.

9. The method for conducting competitive games, whereby a competitive game is conducted between different video game units, according to claim 8, wherein said competitive game conditions set the game time and number of set games.

10. The method for conducting competitive games according to claim 9, wherein, when said competitive game conditions are completed, either one of said any one video game unit and said any other video game unit determines which one of the characters operated by said any one video game unit and said any other video game unit has the higher number of points in the game.

* * * * *